US012669617B2

(12) United States Patent
Lee

(10) Patent No.: US 12,669,617 B2
(45) Date of Patent: Jun. 30, 2026

(54) APPARATUS FOR CONTROLLING VEHICLE AND METHOD THEREOF

(71) Applicants: Hyundai Motor Company, Seoul (KR); Kia Corporation, Seoul (KR)

(72) Inventor: Jae In Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 60 days.

(21) Appl. No.: 18/935,882

(22) Filed: Nov. 4, 2024

(65) Prior Publication Data

US 2025/0377462 A1 Dec. 11, 2025

(30) Foreign Application Priority Data

Jun. 10, 2024 (KR) ........................ 10-2024-0075240

(51) Int. Cl.
*G01S 17/931* (2020.01)
*B60W 60/00* (2020.01)
*G01S 17/89* (2020.01)
*G06T 7/73* (2017.01)
(52) U.S. Cl.
CPC ......... *G01S 17/931* (2020.01); *B60W 60/001* (2020.02); *G01S 17/89* (2013.01); *G06T 7/73* (2017.01); *G06T 2207/10028* (2013.01); *G06T 2207/30252* (2013.01)
(58) Field of Classification Search
CPC .... G06T 7/10; G06T 7/70; G06T 7/73; G06T 2207/10028; G06T 2207/30236; G06T 2207/30248; G06T 2207/30252; G06T 2207/30256; G06T 2207/30261; G01S 17/89; G01S 17/93; G01S 17/931; B60W 60/001; B60W 2420/408; G06V 10/255; G06V 10/46; G06V 10/469; G06V 20/56; G06V 20/588
See application file for complete search history.

(56) References Cited

U.S. PATENT DOCUMENTS

| | | | |
|---|---|---|---|
| 12,449,520 B2 * | 10/2025 | Du | H04W 4/44 |
| 2019/0019041 A1 * | 1/2019 | Ding | G06F 18/285 |
| 2020/0184234 A1 * | 6/2020 | Doria | G05D 1/024 |
| 2024/0094029 A1 * | 3/2024 | Armstrong | G06T 17/05 |

* cited by examiner

*Primary Examiner* — Brandon Z Willis
(74) *Attorney, Agent, or Firm* — Banner & Witcoff, Ltd.

(57) ABSTRACT

An apparatus for controlling autonomous driving of a vehicle comprises a sensor to capture multiple points representing the vehicle's surrounding environment and a processor to analyze these points. The processor maps the points onto a grid derived from a vehicle-centered coordinate system. Using a first algorithm, the processor identifies the locations of the points on the grid. A second algorithm calculates eigenvalues or eigenvectors based on points designated as a specific type. The processor checks if a predefined condition is met by evaluating factors such as the number of points in a grid, the direction of eigenvectors, and point locations. If the condition is satisfied, the processor determines that the points correspond to another designated type, based on the eigenvalues or eigenvectors. The apparatus then generates a signal indicating the classification of the points and controls the vehicle's autonomous driving based on such information.

20 Claims, 7 Drawing Sheets

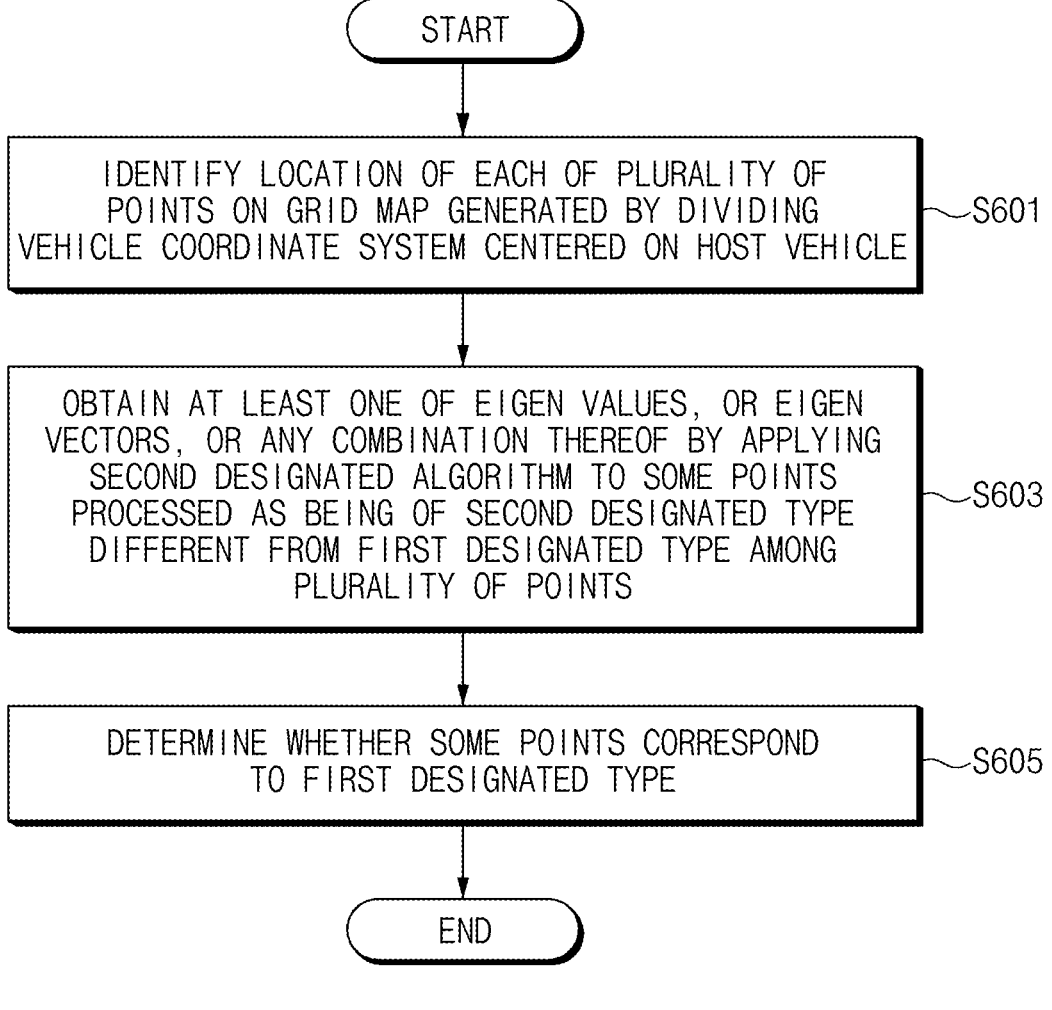

START

IDENTIFY LOCATION OF EACH OF PLURALITY OF
POINTS ON GRID MAP GENERATED BY DIVIDING
VEHICLE COORDINATE SYSTEM CENTERED ON HOST VEHICLE    ~S601

OBTAIN AT LEAST ONE OF EIGEN VALUES, OR EIGEN
VECTORS, OR ANY COMBINATION THEREOF BY APPLYING
SECOND DESIGNATED ALGORITHM TO SOME POINTS
PROCESSED AS BEING OF SECOND DESIGNATED TYPE
DIFFERENT FROM FIRST DESIGNATED TYPE AMONG
PLURALITY OF POINTS    ~S603

DETERMINE WHETHER SOME POINTS CORRESPOND
TO FIRST DESIGNATED TYPE    ~S605

END

FIG.6

APPARATUS FOR CONTROLLING VEHICLE AND METHOD THEREOF

CROSS-REFERENCE TO RELATED APPLICATION

This application claims the benefit of priority to Korean Patent Application No. 10-2024-0075240, filed in the Korean Intellectual Property Office on Jun. 10, 2024, the entire contents of which are incorporated herein by reference.

TECHNICAL FIELD

The present disclosure relates to a vehicle control apparatus and a method thereof, and more particularly, relates to a technology for using light detection and ranging (LiDAR).

BACKGROUND

The matters described in this Background section are only for enhancement of understanding of the background of the disclosure, and should not be taken as acknowledgement that they correspond to prior art already known to those skilled in the art.

Various studies for determining an external object by using various sensors are being conducted to assist the driving of a vehicle.

In particular, while operating in a driving assistance mode or an autonomous driving mode, the vehicle may determine the surrounding environment of the vehicle by using a sensor (e.g., LiDAR).

For the vehicle to determine the surrounding environment of the vehicle for the purpose of controlling the vehicle in the autonomous driving mode, it is useful to accurately determine a line. Accordingly, various studies are being conducted to accurately determine a line.

SUMMARY

According to the present disclosure, an apparatus for controlling autonomous driving of a vehicle, the apparatus may comprise a sensor configured to obtain a plurality of points associated with a surrounding environment of the vehicle, and a processor, wherein the processor is configured to determine, based on a first algorithm, a location of each of the plurality of points on a grid map, wherein the grid map is generated by dividing a vehicle coordinate system centered on the vehicle, obtain, based on a second algorithm, at least one of eigen values or eigen vectors, wherein the second algorithm is configured to be applied to second points, among the plurality of points, based on identifying, on the grid map, at least one grid where the second points are processed as a second designated type and first points, among the plurality of points, are processed as a first designated type different from the second designated type, and determine whether a designated condition is satisfied by at least one of: a number of the second points included in the at least one grid, a direction of a maximum eigen vector, a direction of a minimum eigen vector, a location of the at least one grid on the grid map, or locations of the second points in the at least one grid, determine that the second points correspond to the first designated type, based on the designated condition being satisfied and based on at least one of: the maximum eigen vector corresponding to a maximum value of eigen values among the eigen vectors or the minimum eigen vector corresponding to a minimum value of the eigen values among the eigen vectors, output a signal indicating that the second points correspond to the first designated type, and control, based on the signal, autonomous driving of the vehicle.

The apparatus, wherein the processor is configured to determine, based on the designated condition being satisfied and the number of the second points included in the at least one grid being smaller than a threshold number, that the second points correspond to the first designated type.

The apparatus, wherein the processor is configured to determine that the second points correspond to the first designated type based on the designated condition being satisfied and an angle between the direction of the maximum eigen vector and a reference axis, of the vehicle coordinate system, exceeding a threshold angle.

The apparatus, wherein the processor is configured to determine that the second points correspond to the first designated type based on the designated condition being satisfied and an angle between the direction of the minimum eigen vector and a reference axis, of the vehicle coordinate system, exceeding a threshold angle.

The apparatus, wherein the processor is configured to determine that the second points correspond to the first designated type based on the designated condition being satisfied and the location of the at least one grid being located in a designated area among a plurality of areas designated in advance on the grid map.

The apparatus, wherein the processor is configured to determine that the second points correspond to the first designated type based on the designated condition being satisfied and an angle between a y-axis of the vehicle coordinate system and the minimum eigen vector exceeding a threshold angle, wherein the y-axis is perpendicular to an x-axis of the vehicle coordinate system, and wherein the x-axis is parallel to a moving direction of the vehicle.

The apparatus, wherein the processor is configured to determine that the second points correspond to the first designated type based on the designated condition being satisfied and the locations of the second points being located to be smaller than a threshold height from a ground.

The apparatus, wherein the processor is configured to assign, based on determining that the second points correspond to the first designated type, a flag indicating the first designated type to the second points.

The apparatus, wherein the processor is configured to determine whether the second points are located in one of a plurality of areas obtained by dividing the grid map, based on at least one of an angle between a reference axis of the vehicle coordinate system and a vector associated with the plurality of points, or a shortest distance among distances between the vehicle and each of the plurality of points.

The apparatus, wherein the processor is configured to map the plurality of points onto the grid map, wherein the plurality of points correspond to at least one object located within a designated distance from the vehicle.

According to the present disclosure, a method performed by an apparatus for controlling autonomous driving of a vehicle, the method may comprise determining, based on a first algorithm, a location of each of a plurality of points on a grid map, wherein the plurality of points are associated with a surrounding environment of the vehicle, and wherein the grid map is generated by dividing a vehicle coordinate system centered on the vehicle, obtaining, based on a second algorithm, at least one of eigen values or eigen vectors, wherein the second algorithm is configured to be applied to second points, among the plurality of points, based on identifying, on the grid map, at least one grid where the second points are processed as a second designated type and first points, among the plurality of points, are processed as a first designated type different from the second designated type, and determining whether a designated condition is satisfied by at least one of a number of the second points included in the at least one grid, a direction of a maximum eigen vector, a direction of a minimum eigen vector, a location of the at least one grid on the grid map, or locations of the second points in the at least one grid, determining that second points correspond to the first designated type, based on the designated condition being satisfied and based on at least one of the maximum eigen vector corresponding to a maximum value of eigen values among the eigen vectors or the minimum eigen vector corresponding to a minimum value of the eigen values among the eigen vectors, outputting a signal indicating that the second points correspond to the first designated type, and controlling, based on the signal, autonomous driving of the vehicle.

The method may further comprise determining, based on the designated condition being satisfied and the number of the second points included in the at least one grid being smaller than a threshold number, that the second points correspond to the first designated type.

The method may further comprise determining that the second points correspond to the first designated type based on an angle between the direction of the maximum eigen vector and a reference axis, of the vehicle coordinate system, exceeding a threshold angle.

The method may further comprise determining that the second points correspond to the first designated type based on the designated condition being satisfied and an angle between the direction of the minimum eigen vector and a reference axis, of the vehicle coordinate system, exceeding a threshold angle.

The method may further comprise determining that the second points correspond to the first designated type based on the designated condition being satisfied and the location of the at least one grid being located in a designated area among a plurality of areas designated in advance on the grid map.

The method may further comprise determining that the second points correspond to the first designated type based on the designated condition being satisfied and an angle between a y-axis of the vehicle coordinate system and the minimum eigen vector exceeding a threshold angle, wherein the y-axis is perpendicular to an x-axis of the vehicle coordinate system, and wherein the x-axis is parallel to a moving direction of the vehicle.

The method may further comprise determining that the second points correspond to the first designated type based on the designated condition being satisfied and the locations of the second points being located to be smaller than a threshold height from a ground.

The method may further comprise assigning a flag indicating the first designated type to the second points based on determining that the second points correspond to the first designated type.

The method may further comprise determining whether the second points are located in one of a plurality of areas obtained by dividing the grid map, based on at least one of an angle between a reference axis of the vehicle coordinate system and a vector associated with the plurality of points, or a shortest distance among distances between the vehicle and each of the plurality of points.

The method may further comprise mapping the plurality of points onto the grid map, wherein the plurality of points correspond to at least one object located within a designated distance from the vehicle.

BRIEF DESCRIPTION OF THE DRAWINGS

The above and other objects, features and advantages of the present disclosure will be more apparent from the following detailed description taken in conjunction with the accompanying drawings:

FIG. 1 shows an example of a block diagram associated with a vehicle control apparatus, according to an example of the present disclosure;

FIG. 6 shows an example of a flowchart associated with a vehicle control method, according to an example of the present disclosure.

DETAILED DESCRIPTION

Figure 2:
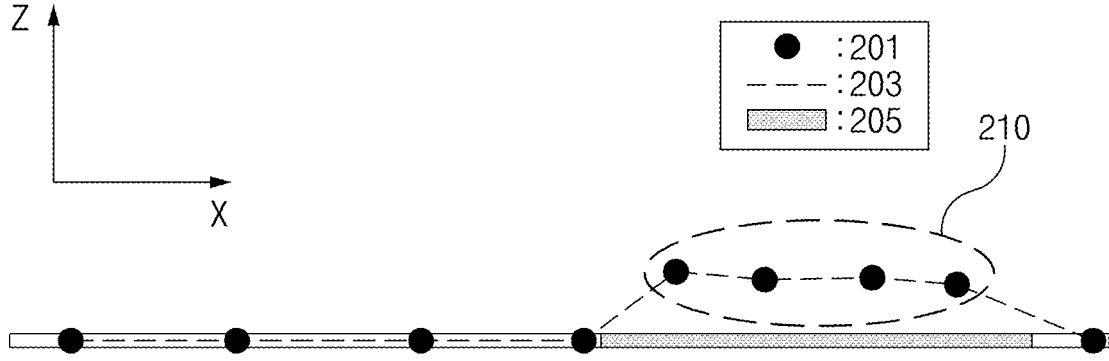
FIG. 2 shows an example of some points processed as being of a second designated type different from a first designated type, in an example of the present disclosure.

Hereinafter, some examples of the present disclosure will be described in detail with reference to the accompanying drawings. In adding reference numerals to components of each drawing, it should be noted that the same components include the same reference numerals, although they are indicated on another drawing. Furthermore, in describing the examples of the present disclosure, detailed descriptions associated with well-known functions or configurations will be omitted if they may make subject matters of the present disclosure unnecessarily obscure.

In describing elements of an example of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as including a meaning that is consistent with their meaning in the context of the present disclosure and the relevant art and will not be interpreted in an idealized or overly formal sense unless expressly so defined herein.

Figure 1:
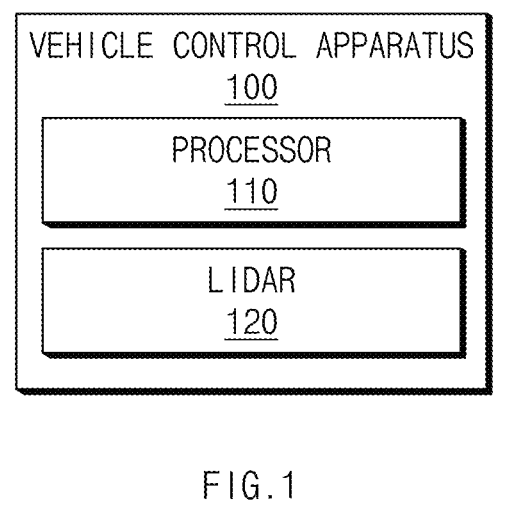

Hereinafter, examples of the present disclosure will be described in detail with reference to FIGS. 1 to 7.

FIG. 1 shows an example of a block diagram associated with a vehicle control apparatus, according to an example of the present disclosure.

Referring to FIG. 1, a vehicle control apparatus 100 according to an example of the present disclosure may be implemented inside or outside a vehicle, and some of components included in the vehicle control apparatus 100 may be implemented inside or outside the vehicle. At this time, the vehicle control apparatus 100 may be integrated with internal control units of a vehicle and may be implemented with a separate device so as to be coupled with control units of the vehicle by means of a separate connection means. For example, the vehicle control apparatus 100 may further include components not shown in FIG. 1.

The vehicle control apparatus 100 according to an example may include a processor 110 and sensor (e.g., camera, LIDAR 120, RADAR, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, etc.). The processor 110 and the LiDAR 120 may be electronically and/or operably coupled with each other by an electronical component including a communication bus.

Hereinafter, the fact that pieces of hardware are coupled operably may include the fact that a direct and/or indirect connection between the pieces of hardware is established by wired and/or wirelessly such that second hardware is controlled by first hardware among the pieces of hardware.

Although different blocks are shown, an example is not limited thereto. Some of the pieces of hardware in FIG. 1 may be included in a single integrated circuit including a system on a chip (SoC). The type and/or number of hardware included in the vehicle control apparatus 100 is not limited to that shown in FIG. 1.

The vehicle control apparatus 100 according to an example may include hardware for processing data based on one or more instructions. The hardware for processing data may include the processor 110.

For example, the hardware for processing data may include an arithmetic and logic unit (ALU), a floating point unit (FPU), a field programmable gate array (FPGA), a central processing unit (CPU), and/or an application processor (AP). The processor 110 may include a structure of a single-core processor, or may include a structure of a multi-core processor including a dual core, a quad core, a hexa core, or an octa core.

The vehicle control apparatus 100 according to an example may include hardware for detecting the surrounding environment of a vehicle. For example, the hardware for detecting the surrounding environment of the vehicle may include the LiDAR 120. For example, the hardware for detecting the surrounding environment of the vehicle may include at least one of the LiDAR 120, a RADAR, a camera, or an ultrasonic sensor, or any combination thereof. However, an example of the present disclosure is not limited to the above description.

For example, the LiDAR 120 may obtain data sets obtained by determining objects surrounding the vehicle control apparatus 100 (or a vehicle including the vehicle control apparatus 100). For example, the LiDAR 120 may determine at least one of a location of the surrounding object, a movement direction of the surrounding object, or the speed of the surrounding object, an object's distance from the LiDAR sensor, an object's size and shape, an object's orientation in space, the object's surface characteristics (e.g., smooth or rough), the object's classification (e.g., pedestrian, vehicle, or obstacle), or a change in the object's velocity over time (acceleration or deceleration), or any combination thereof based on a pulse laser signal emitted from the LiDAR 120 being reflected and returned by the surrounding object.

For example, the processor 110 may obtain a plurality of points for the surrounding environment of the vehicle based on data sets obtained by the LiDAR 120. For example, the processor 110 may obtain a plurality of points representing the surrounding environment of the vehicle.

In an example, the processor 110 may input a plurality of points into a first designated algorithm. For example, the first designated algorithm may include an algorithm for mapping the plurality of points onto a grid map. For example, the first designated algorithm may include a concentric zone model. Additionally or alternatively, the first designated algorithm may include a k-means clustering algorithm for grouping points based on proximity, a probabilistic occupancy grid for estimating the likelihood of objects occupying specific grid cells, a quadtree decomposition algorithm for hierarchically partitioning the space into adaptable grid sizes, a Kalman filter for tracking and predicting the motion of objects, a Simultaneous Localization and Mapping (SLAM) algorithm for constructing a map of the environment while tracking the sensor's position, or a DBSCAN (Density-Based Spatial Clustering of Applications with Noise) algorithm for determining clusters of points and distinguishing noise.

For example, the processor 110 may map the plurality of points identified within a designated distance from the vehicle onto the grid map.

For example, the processor 110 may determine a location of each of the plurality of points on the grid map generated by dividing a vehicle coordinate system centered on the vehicle, based on inputting the plurality of points into the first designated algorithm.

For example, the processor 110 may determine whether some points are located in one of a plurality of areas, which are obtained by dividing the grid map, based on at least one of an angle between a reference axis of the vehicle coordinate system and a vector associated with the plurality of points, or the shortest distance among distances between the vehicle and each of the plurality of points, or any combination thereof.

While operating in a driving assistance mode or an autonomous driving mode, a vehicle may determine surrounding environment of the vehicle by accurately determining a line. In the context of driving assistance or autonomous driving, the vehicle may determine a variety of lines to accurately understand the surrounding environment. These lines may comprise lane markings, such as solid or dashed white or yellow lines that define lane divisions, as well as road edges, which may comprise curbs or painted road-edge lines. The vehicle may also detect pedestrian crossings, represented by zebra stripes, and the boundaries of parking spots in parking lots or along streets. Other lines may comprise stop lines at intersections or crosswalks, barriers or guardrails along the edge of the road or medians, and road dividers, which may be painted lines or physical structures like rumble strips. In addition, the vehicle may determine guidance lines in tunnels or narrow roads that help with directional navigation, as well as turn markings or arrows indicating lane-specific turning directions. Further, in certain scenarios, the vehicle may interpret parallel lines of railroad tracks as part of the surrounding environment.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver if the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.).

In an example, the processor 110 may determine the type of the points. For example, the processor 110 may determine whether the type of the points is a first designated type or a second designated type different from the first designated type. For example, the first designated type may include a line. For example, the second designated type may include a type that is not a line.

For example, the processor 110 may apply a second designated algorithm to the some points based on determining, on the grid map, at least one grid where there are some points, which are processed as being of the second designated type different from the first designated type, from among the plurality of points. For example, the second designated algorithm may include singular value decomposition. Additionally or alternatively, the second designated algorithm may include principal component analysis (PCA) for dimensionality reduction and extraction of key features, non-negative matrix factorization (NMF) for decomposing data into non-negative factors, canonical correlation analysis (CCA) for determining relationships between two sets of variables, eigen decomposition of covariance matrices for extracting key directions of data variance, independent component analysis (ICA) for separating a multivariate signal into independent components, QR decomposition for solving linear systems, or a spectral clustering algorithm that may use eigen values of similarity matrices to perform clustering.

An eigen vector is a non-zero vector that changes by only a scalar factor if a linear transformation (represented by a matrix) is applied to the eigen vector. In other words, an eigenvector points in a direction that does not change during the transformation (though it may get stretched or compressed). An eigen value $\lambda$ represents the factor by which the corresponding eigen vector is scaled during the transformation. It may indicate how much the eigen vector is stretched (if $\lambda>1$) or compressed (if $0<\lambda<1$). If $\lambda$ is negative, the vector is also flipped in direction.

For example, the processor 110 may obtain at least one of eigen values, or eigen vectors, or any combination thereof by applying the second designated algorithm to some points based on determining, on the grid map, at least one grid where there are some points processed as being of the second designated type different from the first designated type among the plurality of points.

In an example, the processor 110 may determine at least one of a maximum eigen vector corresponding to the maximum value of eigen values among the eigen vectors, or a minimum eigen vector corresponding to the minimum value of eigen values among the eigen vectors, or any combination thereof.

In an example, the processor 110 may determine whether at least one of i) the number of some points included in at least one grid, ii) a direction of the maximum eigen vector, iii) a direction of the minimum eigen vector, iv) a location of at least one grid on the grid map, or v) locations of some points in at least one grid, or any combination thereof satisfies a designated condition, based on determining at least one of the maximum eigen vector corresponding to the maximum value of eigen values among the eigen vectors, or the minimum eigen vector corresponding to the minimum value of eigen values among the eigen vectors, or any combination thereof.

For example, the processor 110 may determine whether some points correspond to the first designated type, by determining whether at least one of the number of some points included in at least one grid, a direction of the maximum eigen vector, a direction of the minimum eigen vector, a location of at least one grid on the grid map, or locations of some points in at least one grid, or any combination thereof satisfies the designated condition, based on determining at least one of the maximum eigen vector corresponding to the maximum value of eigen values among the eigen vectors, or the minimum eigen vector corresponding to the minimum value of eigen values among the eigen vectors, or any combination thereof.

For example, the processor 110 may determine whether the number of some points included in at least one grid is smaller than the designated number. For example, the processor 110 may determine whether the designated condition is satisfied, based on the number of some points included in at least one grid being smaller than the designated number. The processor 110 may determine that some points correspond to the first designated type, by determining that the designated condition is satisfied, based on the number of some points included in at least one grid being smaller than the designated number.

For example, the processor 110 may determine the direction of the maximum eigen vector. For example, the processor 110 may determine whether an angle between the direction of the maximum eigen vector and the reference axis exceeds a threshold angle. For example, the reference axis may include an x-axis (e.g., a moving direction of a vehicle). For example, the angle formed by the reference axis may include a value that increases in a counterclockwise direction on the x-axis. For example, the angle formed by the reference axis may include a value that decreases in a clockwise direction on the x-axis. For example, the angle formed by the reference axis may include a positive value if increasing in a counterclockwise direction on the x-axis. For example, the angle formed by the reference axis may include a negative value if decreasing in a clockwise direction on the x-axis.

For example, the processor 110 may determine that some points correspond to the first designated type by determining that the designated condition is satisfied, based on the angle between the direction of the maximum eigen vector and the reference axis exceeding the threshold angle.

In an example, the processor 110 may determine the direction of the minimum eigen vector. For example, the processor 110 may determine whether an angle between the direction of the minimum eigen vector and the reference axis exceeds a threshold angle. For example, the processor 110 may determine that some points correspond to the first designated type by determining that the designated condition is satisfied, based on the angle between the direction of the minimum eigen vector and the reference axis exceeding the threshold angle.

In an example, the processor 110 may determine whether a location of at least one grid is located in a designated area among a plurality of areas, which are designated in advance, on the grid map. For example, the plurality of areas designated in advance may include areas placed within the designated distance from the vehicle. For example, the designated distance may include approximately 57 m. For example, the plurality of areas designated in advance may be designated based on an equation for determining a patch-grid.

For example, the processor 110 may determine that some points correspond to the first designated type, by determining that the designated condition is satisfied, based on the location of at least one grid being located in a designated area among the plurality of areas designated in advance on the grid map.

In an example, the processor 110 may determine an angle between the minimum eigen vector and a second reference axis, which is perpendicular to a first reference axis corresponding to the x-axis of the vehicle coordinate system and which corresponds to the y-axis of the vehicle coordinate system. For example, the processor 110 may determine that some points correspond to the first designated type by determining that the designated condition is satisfied, based on the angle between the second reference axis and the minimum eigen vector exceeding the threshold angle.

In an example, the processor 110 may determine locations of some points. For example, the processor 110 may determine heights of some points from the ground. For example, the processor 110 may determine whether the locations of some points are located to be smaller than the threshold height from the ground. For example, the processor 110 may determine that some points correspond to the first designated type, by determining that the designated condition is satisfied, based on the locations of some points being located to be smaller than the threshold height from the ground.

In an example, the processor 110 may determine that at least one of the number of some points included in at least one grid, the direction of the maximum eigen vector, the direction of the minimum eigen vector, the location of at least one grid in the grid map, or the locations of some points in at least one grid, or any combination thereof does not satisfy at least one of the designated conditions described above, based on determining at least one of the maximum eigen vector corresponding to the maximum value of eigen values among the eigen vectors, or the minimum eigen vector corresponding to the minimum value of eigen values among the eigen vectors, or any combination thereof.

For example, the processor 110 may determine that some points are of the second designated type different from the first designated type, based on determining that at least one of the designated conditions described above is not satisfied. The processor 110 may perform a process of determining whether some points identified as being of the second designated type correspond to an external object, based on determining some points are of the second designated type different from the first designated type.

In an example, the processor 110 may assign a flag indicating the first designated type to some points based on determining that the some points correspond to the first designated type.

For example, the processor 110 may not output the some points to which the flag indicating the first designated type is assigned. For example, the processor 110 may at least temporarily stop outputting the some points to which the flag indicating the first designated type is assigned. For example, the processor 110 may bypass the output of the some points to which the flag indicating the first designated type is assigned.

As mentioned above, the processor 110 of the vehicle control apparatus 100 according to an example may assign an identifier (or a flag) indicating the first designated type (e.g., line) to some misrecognized points, which are capable of being expressed as an external object, from among the plurality of points obtained through the LiDAR 120. The processor 110 may not perform clustering on some points by not outputting some points based on assigning an identifier indicating the first designated type to some points. The processor 110 may perform a process of classifying the some points as a line by not performing clustering on the some points.

FIG. 2 shows an example of some points processed as being of a second designated type different from a first designated type, in an example of the present disclosure.

Referring to FIG. 2, a processor (e.g., the processor 110 in FIG. 1) of a vehicle control apparatus (e.g., the vehicle control apparatus 100 of FIG. 1) according to an example may obtain a plurality of points for the surrounding environment of a vehicle through a LiDAR (e.g., the LiDAR 120 in FIG. 1). FIG. 2 may include an example expressing at least some of the plurality of points for the surrounding environment of the vehicle.

A plurality of points 201, line segments 203, and/or a line 205 shown in FIG. 2 may be expressed based on an x-axis and an z-axis of a vehicle coordinate system centered on the vehicle. For example, the vehicle coordinate system may include the x-axis facing the front of the vehicle, a y-axis facing the left of the vehicle, and the z-axis perpendicular to the front of the vehicle and perpendicular to the ground.

In an example, the processor may obtain the plurality of points 201 through the LiDAR. For example, the processor may obtain the line segments 203 obtained by sequentially connecting the plurality of points 201. For example, the processor may determine the slope of each of the line segments 203.

FIG. 2 may include an example in which some points 210 spaced from the line 205 are identified.

In an example, the processor may accurately detect some points 210 spaced from the line 205 and may assign an identifier (or a flag) indicating the line to some points 210 not to apply the process of determining an external object for the some detected points 210.

Examples of the present disclosure may include at least some of the processes for assigning an identifier indicating a line to the some points 210.

Figure 3:
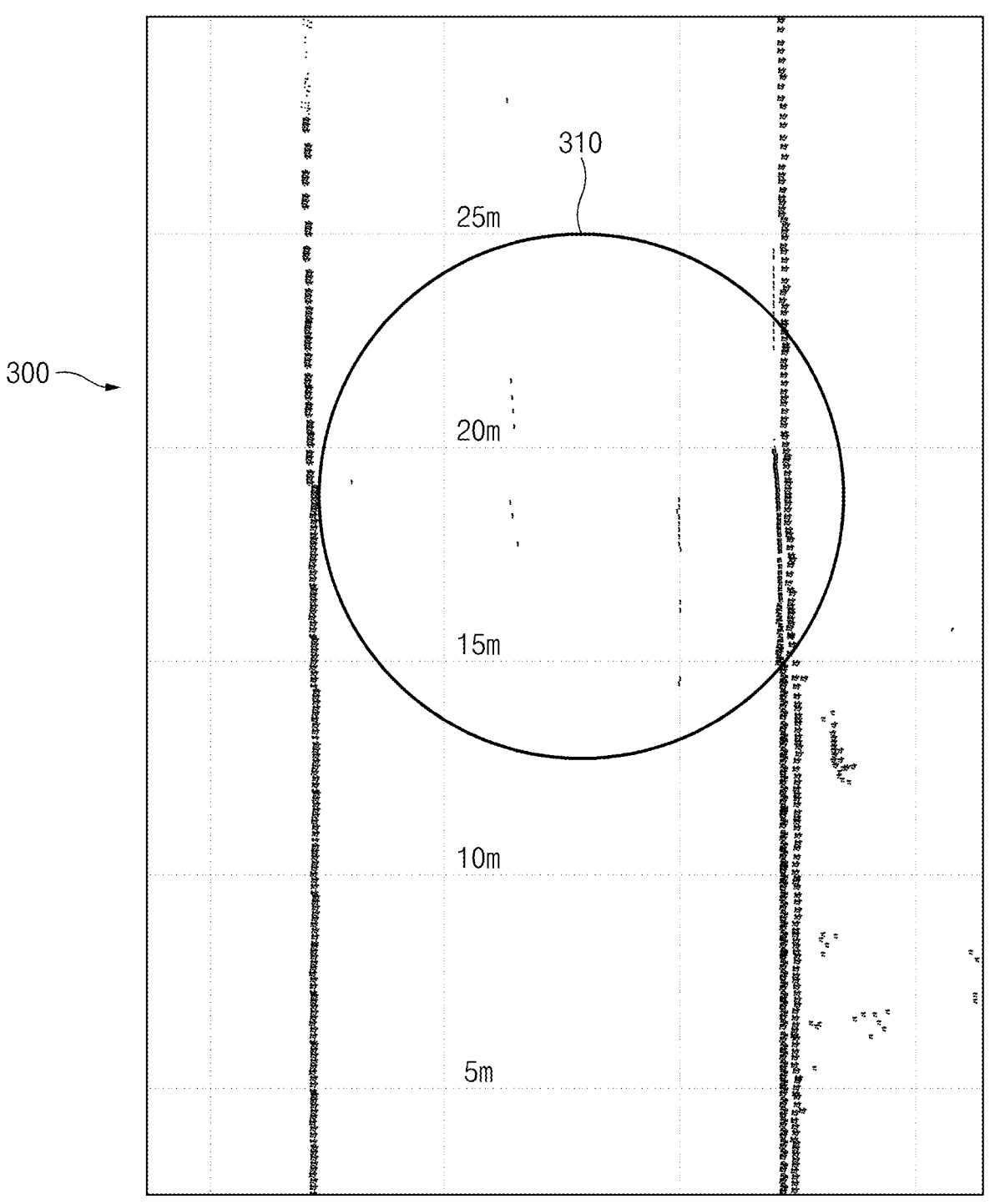
FIG. 3 shows an example of some points processed as being of a second designated type different from a first designated type, in an example of the present disclosure.

FIG. 3 shows an example of some points processed as being of a second designated type different from a first designated type, in an example of the present disclosure.

Referring to FIG. 3, a processor (e.g., the processor 110 of FIG. 1) of a vehicle control apparatus (e.g., the vehicle control apparatus 100 of FIG. 1) according to an example may express a plurality of points obtained through a LiDAR in a vehicle coordinate system 300.

The vehicle coordinate system 300 shown in FIG. 3 may originally be a three-dimensional coordinate system, but may be a two-dimensional coordinate system. For example, the vehicle coordinate system 300 may include an x-axis facing the front of a vehicle, and a y-axis facing the left of the vehicle.

For example, the processor may determine some points 310 among a plurality of points expressed in the vehicle coordinate system 300. For example, the some points 310 may include a vertical component crosstalk identified in a direction perpendicular to a line. For example, the crosstalk may be a point that is detected even though there is no actual object. Accordingly, because crosstalk is an incorrectly detected point, it is necessary to remove the crosstalk or to assign an appropriate identifier to the crosstalk by perform an appropriate process on the crosstalk.

Additionally, crosstalk may occur due to signal reflections from the vehicle's own body or nearby surfaces (e.g., reflections from the road surface or vehicle parts, such as mirrors or bumpers), which causes false detection of points that are not real objects in the surrounding environment. Crosstalk may also result from interference between multiple sensors, where signals from another sensor's output are mistakenly detected as objects. Crosstalk may also arise from environmental factors such as rain, fog, or snow, where laser or sensor signals are scattered and cause spurious points to appear in the sensor data. Another example of crosstalk could be multipath reflections, where the signal bounces off multiple surfaces before returning to the sensor, creating ghost points that do not correspond to actual objects.

With regard to the above-described crosstalk, examples of the present disclosure may include a pre-processing technology for not performing an object identification process on the some points 310 by assigning the first designated type (i.e., an identifier indicating a line) to the some points 310 determined as crosstalk.

Figure 4:
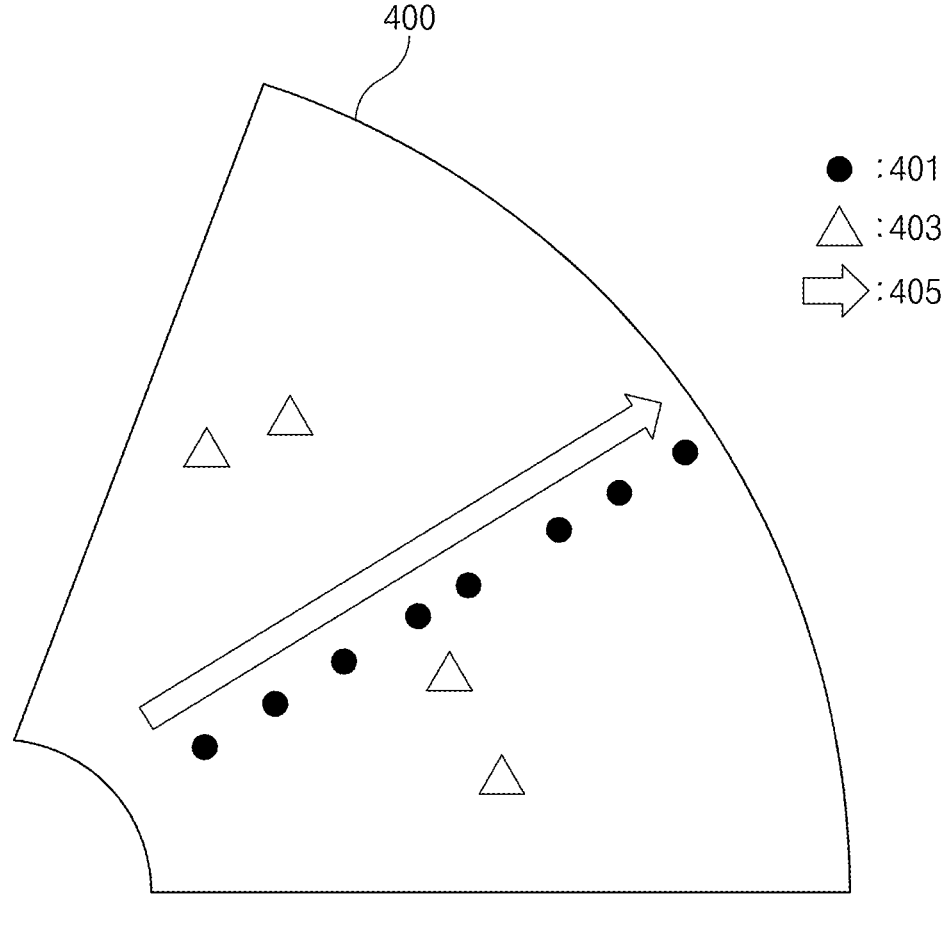
FIG. 4 shows an example of obtaining an eigen vector, in an example of the present disclosure.

FIG. 4 shows an example of obtaining an eigen vector, in an example of the present disclosure.

Referring to FIG. 4, a processor (e.g., the processor 110 in FIG. 1) of a vehicle control apparatus (e.g., the vehicle control apparatus 100 of FIG. 1) according to an example may obtain a vector 405 based on valid points 401.

For example, the processor may determine the valid points 401, which excludes ground points 403, from among a plurality of points within a designated area 400. The processor may obtain the vector 405 based on the identified valid points 401. For example, the vector 405 may include an eigen vector.

For example, the processor may perform singular value decomposition on each sector in a designed concentric zone model. For example, the concentric zone model may be included in a first designated algorithm. For example, the singular value decomposition may include a second designated algorithm. The designated area 400 shown in FIG. 4 may include at least part of the sector. For example, the designated area 400 may be included in at least one grid described above.

For example, the processor may determine the ground points 403 among a plurality of points in the designated area 400. For example, the processor may determine the valid points 401, excluding the ground points 403, among the plurality of points based on determining the ground points 403 in the designated area 400.

For example, the processor may obtain an eigen value and/or an eigen vector by using the valid points 401. For example, the processor may obtain a maximum eigen vector corresponding to the greatest maximum value among eigen values. For example, the processor may obtain a minimum eigen vector corresponding to the smallest minimum value among the eigen values.

For example, the processor may determine whether the valid points 401 may correspond to a line, based on the obtained maximum eigen vector, and/or minimum eigen vector. For example, the processor may determine whether the valid points 401 may correspond to a line, based on whether the maximum eigen vector and/or minimum eigen vector satisfies a designated condition.

Figure 5:
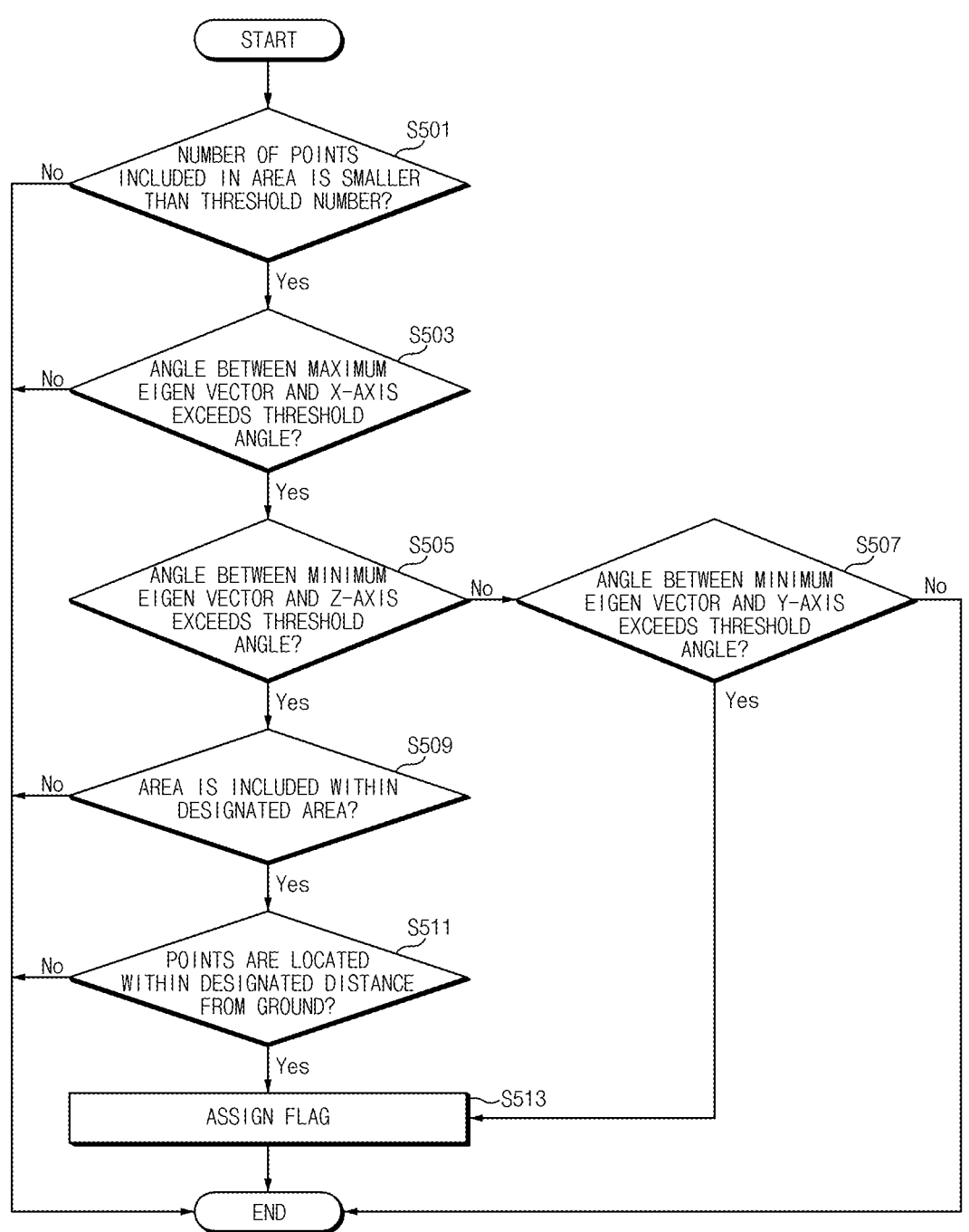
FIG. 5 shows an example of a flowchart associated with a vehicle control method, according to an example of the present disclosure.

FIG. 5 shows an example of a flowchart associated with a vehicle control method, according to an example of the present disclosure.

Hereinafter, it is assumed that the vehicle control apparatus 100 of FIG. 1 performs the process of FIG. 5. In addition, in a description of FIG. 5, it may be understood that an operation described as being performed by an apparatus is controlled by the processor 110 of the vehicle control apparatus 100.

At least one of operations of FIG. 5 may be performed by the vehicle control apparatus 100 of FIG. 1. At least one of operations of FIG. 5 may be performed by the processor 110 of FIG. 1. Each of the operations in FIG. 5 may be performed sequentially, but is not necessarily sequentially performed. For example, the order of operations may be changed, and at least two operations may be performed in parallel.

Referring to FIG. 5, in S501, the vehicle control method according to an example may include an operation of determining whether the number of points included in an area is smaller than the threshold number.

For example, the vehicle control method may include an operation of determining whether the number of points included in the area includes a line feature. For example, the vehicle control method may include an operation of determining whether the number of points with the line feature within the area is smaller than the threshold number. For example, the area may be referred to as a "sector".

If the number of points included in the area is smaller than the threshold number (Yes in S501), in S503, the vehicle control method according to an example may include an operation of determining whether an angle between a maximum eigen vector and an x-axis exceeds the threshold angle.

For example, the vehicle control method may include an operation of determining whether the direction of the maximum eigen vector identified within the area exceeds the threshold angle relative to the x-axis of the vehicle coordinate system.

For example, if the direction of the maximum eigen vector rotates counterclockwise on the x-axis, the direction of the maximum eigen vector may include a positive value.

If the angle between the maximum eigen vector and the x-axis exceeds the threshold angle (Yes in S503), in S505, the vehicle control method according to an example may include an operation of determining whether an angle between a minimum eigen vector and a z-axis exceeds the threshold angle.

For example, the vehicle control method may include an operation of determining a state where the direction of the minimum eigen vector is perpendicular to the ground.

If the angle between the minimum eigen vector and the z-axis does not exceed the threshold angle (No in S505), in S507, the vehicle control method according to an example may include an operation of determining whether the angle between the minimum eigen vector and the y-axis exceeds the threshold angle.

For example, the vehicle control method may include an operation of determining whether some points forming the minimum eigen vector are parallel to a line, based on determining whether an angle between the minimum eigen vector and the y-axis exceeds the threshold angle.

If the angle between the minimum eigen vector and the z-axis exceeds the threshold angle (Yes in S505), in S509, the vehicle control method according to an example may include an operation of determining whether the area is included within a designated area.

For example, the vehicle control method may include an operation of determining whether the area is included within the designated area that exceeds the first designated distance and is smaller than the second designated distance from the vehicle.

If the area is included within the designated area (Yes in S509), in S511, the vehicle control method according to an example may include an operation of determining whether points are located within a designated distance from the ground.

For example, the vehicle control method may include an operation of determining whether points correspond to a line, by determining whether the points are located within a designated distance from the ground.

For example, the vehicle control method may include an operation of determining that the points correspond to a line, based on the points being located within the designated distance from the ground.

For example, the vehicle control method may include an operation of determining that the points do not correspond to a line, based on the points being located outside the designated distance from the ground.

If the points are located within a designated distance from the ground (No in S511), or the angle between the minimum eigen vector and the y-axis exceeds the threshold angle (Yes in S507), in S513, the vehicle control method according to an example may include an operation of assigning a flag.

For example, the vehicle control method may include an operation of assigning the flag to the points. For example, the vehicle control method may include an operation of assigning the flag indicating a line to the points.

If the number of points included in the area is not less than the threshold number (No in S501), the angle between the maximum eigen vector and the x-axis does not exceed the threshold angle (No in S503), the angle between the minimum eigen vector and the y-axis does not exceed the threshold angle (No in S507), the area is not included in the designated area (No in S509), or the points are not located within a designated distance from the ground (No in S511), the vehicle control method according to an example may include an operation of terminating a process for the points.

As described above, the vehicle control method according to one example may include operations of preventing, in advance, an object classification process on points, to which the flag is assigned, from being performed, by assigning a flag indicating a line to points.

FIG. 6 shows an example of a flowchart associated with a vehicle control method, according to an example of the present disclosure.

Hereinafter, it is assumed that the vehicle control apparatus 100 of FIG. 1 performs the process of FIG. 6. In addition, in a description of FIG. 6, it may be understood that an operation described as being performed by an apparatus is controlled by the processor 110 of the vehicle control apparatus 100.

At least one of operations of FIG. 6 may be performed by the vehicle control apparatus 100 of FIG. 1. At least one of operations of FIG. 6 may be performed by the processor 110 of FIG. 1. Each of the operations in FIG. 6 may be performed sequentially, but is not necessarily sequentially performed. For example, the order of operations may be changed, and at least two operations may be performed in parallel.

Referring to FIG. 6, in S601, the vehicle control method may include an operation of determining a location of each of the plurality of points on the grid map generated by dividing a vehicle coordinate system centered on the vehicle.

For example, the vehicle control method may include an operation of determining a location of each of the plurality of points on a grid map based on inputting the plurality of points obtained through a LiDAR into a first designated algorithm.

In S603, the vehicle control method may include an operation of obtaining at least one of eigen values, or eigen vectors, or any combination thereof by applying a second designated algorithm to some points processed as being of a second designated type different from a first designated type among a plurality of points.

For example, the vehicle control method may include an operation of obtaining at least one of eigen values, or eigen vectors, or any combination thereof by applying the second designated algorithm to some points based on determining, on the grid map, at least one grid where there are some points, which are not processed as being of the first designated type, from among the plurality of points.

In S605, the vehicle control method may include an operation of determining whether the some points correspond to the first designated type.

For example, the vehicle control method may include an operation of determining whether some points correspond to the first designated type, under the designated condition.

For example, the vehicle control method may include an operation of determining whether some points correspond to the first designated type, by determining whether at least one of the number of some points included in at least one grid, a direction of the maximum eigen vector, a direction of the minimum eigen vector, a location of at least one grid on the grid map, or locations of some points in at least one grid, or any combination thereof satisfies the designated condition, based on determining at least one of the maximum eigen vector corresponding to the maximum value of eigen values among the eigen vectors, or the minimum eigen vector corresponding to the minimum value of eigen values among the eigen vectors, or any combination thereof.

For example, the vehicle control method may include an operation of assigning a first identifier (or a first flag) indicating the first designated type to some points, based on some points corresponding to the first designated type.

For example, the vehicle control method may include an operation of assigning a second identifier (or a second flag) indicating a type different from the first designated type to some points, based on some points corresponding to the type different from the first designated type.

Figure 7:
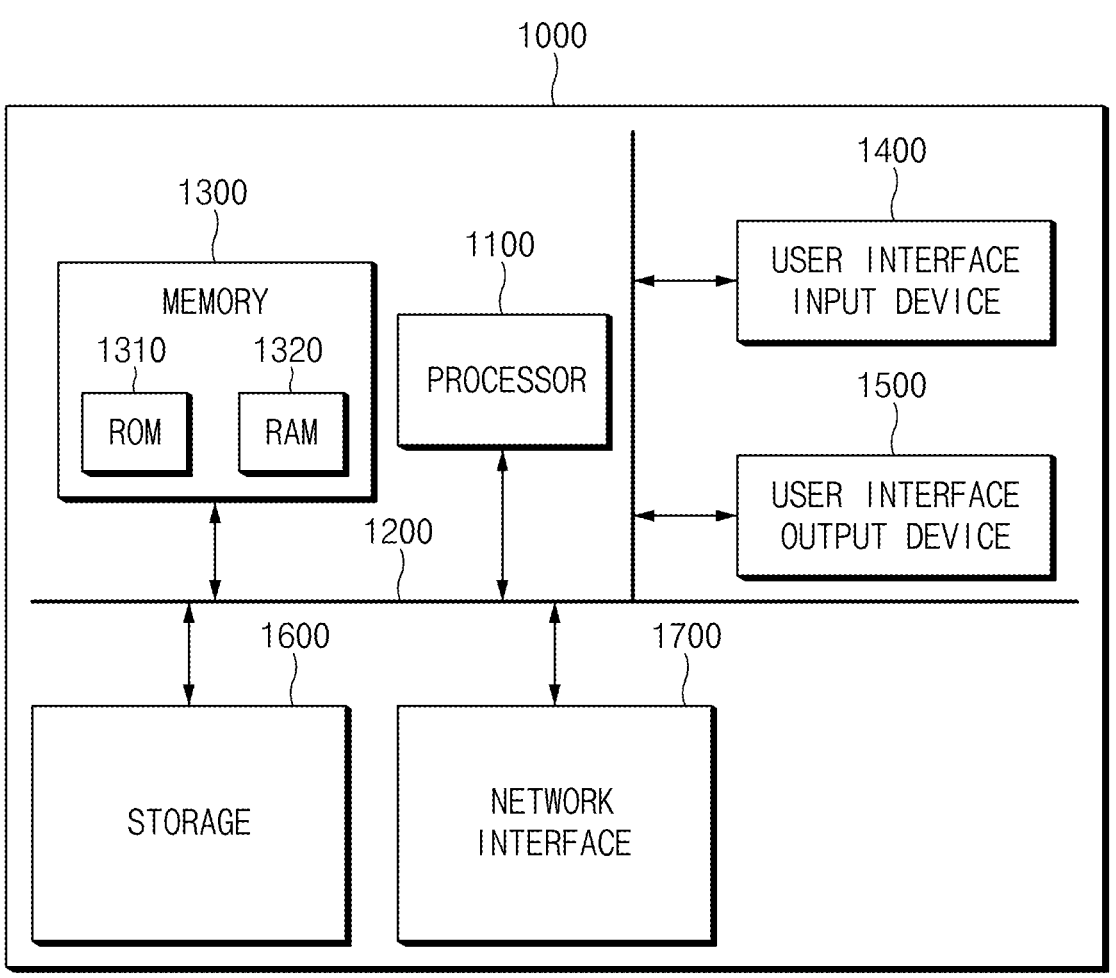
FIG. 7 shows an example of a computing system associated with a vehicle control apparatus or vehicle control method, according to an example of the present disclosure.

FIG. 7 shows an example of a computing system associated with a vehicle control apparatus or vehicle control method, according to an example of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the examples of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

The present disclosure was made to solve the abovementioned problems occurring in the prior art while advantages achieved by the prior art are maintained intact.

An example of the present disclosure provides a vehicle control apparatus for assigning a flag to incorrectly identified points by processing points obtained by a LiDAR, a method thereof.

An example of the present disclosure provides a vehicle control apparatus for determining whether points, which are not processed as a line, correspond to the line, a method thereof.

An example of the present disclosure provides a vehicle control apparatus for classifying crosstalk as a ground and/or a line by applying an algorithm to points not recognized as a road surface due to the crosstalk, a method thereof.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a vehicle control apparatus may include a light detection and ranging (LiDAR) that obtains a plurality of points for a surrounding environment of a vehicle, and a processor. The processor may determine a location of each of the plurality of points on a grid map generated by dividing a vehicle coordinate system centered on the vehicle, based on inputting the plurality of points into a first designated algorithm, may obtain at least one of eigen values, or eigen vectors, or any combination thereof by applying a second designated algorithm to some points based on determining, on the grid map, at least one grid where there are the some points processed as being of a second designated type different from a first designated type among the plurality of points, and may determine whether the some points correspond to the first designated type, by determining whether at least one of a number of the some points included in the at least one grid, a direction of a maximum eigen vector, a direction of a minimum eigen vector, a location of the at least one grid on the grid map, or locations of the some points in the at least one grid, or any combination thereof satisfies a designated condition, based on determining at least one of the maximum eigen vector corresponding to a maximum value of the eigen values among the eigen vectors, or the minimum eigen vector corresponding to a minimum value of the eigen values among the eigen vectors, or any combination thereof.

In an example, the processor may determine that the some points correspond to the first designated type, by determining that the designated condition is satisfied, based on the number of the some points included in the at least one grid being smaller than a threshold number.

In an example, the processor may determine that the some points correspond to the first designated type, by determining that the designated condition is satisfied, based on an angle between the direction of the maximum eigen vector and a reference axis included in the vehicle coordinate system exceeding a threshold angle.

In an example, the processor may determine that the some points correspond to the first designated type, by determining that the designated condition is satisfied, based on an angle between the direction of the minimum eigen vector and a reference axis included in the vehicle coordinate system exceeding a threshold angle.

In an example, the processor may determine that the some points correspond to the first designated type, by determining that the designated condition is satisfied, based on the location of the at least one grid being located in a designated area among a plurality of areas designated in advance on the grid map.

In an example, a reference axis included in the vehicle coordinate system may include a first reference axis corresponding to an x-axis of the vehicle coordinate system. In an example, the processor may determine that the some points correspond to the first designated type by determining that the designated condition is satisfied, based on an angle between a second reference axis corresponding to a y-axis of the vehicle coordinate system and the minimum eigen vector exceeding a threshold angle.

In an example, the processor may determine that the some points correspond to the first designated type, by determining that the designated condition is satisfied, based on the locations of the some points being located to be smaller than a threshold height from a ground.

In an example, the processor may assign a flag indicating the first designated type to the some points based on determining that the some points correspond to the first designated type.

In an example, the processor may determine whether the some points are located in one of a plurality of areas obtained by dividing the grid map, based on at least one of an angle between a reference axis of the vehicle coordinate system and a vector associated with the plurality of points, or a shortest distance among distances between the vehicle and each of the plurality of points, or any combination thereof.

In an example, the processor may map the plurality of points identified within a designated distance from the vehicle onto the grid map.

According to an example of the present disclosure, a vehicle control method may include determining, by a processor, a location of each of a plurality of points on a grid map generated by dividing a vehicle coordinate system centered on a vehicle, based on inputting the plurality of points for a surrounding environment of the vehicle into a first designated algorithm, obtaining at least one of eigen values, or eigen vectors, or any combination thereof by applying a second designated algorithm to some points based on determining, on the grid map, at least one grid where there are the some points processed as being of a second designated type different from a first designated type among the plurality of points, and determining whether the some points correspond to the first designated type, by determining whether at least one of a number of the some points included in the at least one grid, a direction of a maximum eigen vector, a direction of a minimum eigen vector, a location of the at least one grid on the grid map, or locations of the some points in the at least one grid, or any combination thereof satisfies a designated condition, based on determining at least one of the maximum eigen vector corresponding to a maximum value of the eigen values among the eigen vectors, or the minimum eigen vector corresponding to a minimum value of the eigen values among the eigen vectors, or any combination thereof.

According to an example, the vehicle control method may include determining that the some points correspond to the first designated type, by determining that the designated condition is satisfied, based on the number of the some points included in the at least one grid being smaller than a threshold number.

According to an example, the vehicle control method may include determining that the some points correspond to the first designated type, by determining that the designated condition is satisfied, based on an angle between the direction of the maximum eigen vector and a reference axis included in the vehicle coordinate system exceeding a threshold angle.

According to an example, the vehicle control method may include determining that the some points correspond to the first designated type, by determining that the designated condition is satisfied, based on an angle between the direction of the minimum eigen vector and a reference axis included in the vehicle coordinate system exceeding a threshold angle.

According to an example, the vehicle control method may include determining that the some points correspond to the first designated type, by determining that the designated condition is satisfied, based on the location of the at least one grid being located in a designated area among a plurality of areas designated in advance on the grid map.

In an example, a reference axis included in the vehicle coordinate system may include a first reference axis corresponding to an x-axis of the vehicle coordinate system. The vehicle control method may include determining that the some points correspond to the first designated type by determining that the designated condition is satisfied, based on an angle between a second reference axis corresponding to a y-axis of the vehicle coordinate system and the minimum eigen vector exceeding a threshold angle.

According to an example, the vehicle control method may include determining that the some points correspond to the first designated type, by determining that the designated condition is satisfied, based on the locations of the some points being located to be smaller than a threshold height from a ground.

According to an example, the vehicle control method may include assigning a flag indicating the first designated type to the some points based on determining that the some points correspond to the first designated type.

According to an example, the vehicle control method may include determining whether the some points are located in one of a plurality of areas obtained by dividing the grid map, based on at least one of an angle between a reference axis included in the vehicle coordinate system and a vector associated with the plurality of points, or a shortest distance among distances between the vehicle and each of the plurality of points, or any combination thereof.

According to an example, the vehicle control method may include mapping the plurality of points identified within a designated distance from the vehicle onto the grid map.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

Therefore, the examples of the present disclosure are provided to explain the spirit and scope of the present disclosure, but not to limit them, so that the spirit and scope of the present disclosure is not limited by the examples. The scope of the present disclosure should be construed on the basis of the accompanying claims, and all the technical ideas within the scope equivalent to the claims should be included in the scope of the present disclosure.

The above description is merely an example of the technical idea of the present disclosure, and various modifications and modifications may be made by one skilled in the art without departing from the exemplary characteristic of the present disclosure.

Accordingly, examples of the present disclosure are intended not to limit but to explain the technical idea of the present disclosure, and the scope and spirit of the present disclosure is not limited by the above examples. The scope of protection of the present disclosure should be construed by the attached claims, and all equivalents thereof should be construed as being included within the scope of the present disclosure.

The present technology may assign a flag to incorrectly identified points by processing points obtained by a sensor (e.g., LiDAR).

Moreover, the present technology may determine whether points, which are not processed as a line, correspond to the line.

Furthermore, the present technology may classify crosstalk as a ground and/or a line by applying an algorithm to points not recognized as a road surface due to the crosstalk.

Besides, a variety of effects directly or indirectly understood through the present disclosure may be provided.

Hereinabove, although the present disclosure was described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling autonomous driving of a vehicle, the apparatus comprising:

a sensor configured to obtain a plurality of points associated with a surrounding environment of the vehicle; and a processor, wherein the processor is configured to:

determine, based on a first algorithm, a location of each of the plurality of points on a grid map, wherein the grid map is generated by dividing a vehicle coordinate system centered on the vehicle;

obtain, based on a second algorithm, at least one of eigen values or eigen vectors, wherein the second algorithm is configured to be applied to second points, among the plurality of points, based on identifying, on the grid map, at least one grid where the second points are processed as a second designated type and first points, among the plurality of points, are processed as a first designated type different from the second designated type;

determine whether a designated condition is satisfied by at least one of:

a number of the second points included in the at least one grid, a direction of a maximum eigen vector, a direction of a minimum eigen vector, a location of the at least one grid on the grid map, or locations of the second points in the at least one grid;

determine that the second points correspond to the first designated type, based on the designated condition being satisfied and based on at least one of: the maximum eigen vector corresponding to a maximum value of eigen values among the eigen vectors or the minimum eigen vector corresponding to a minimum value of the eigen values among the eigen vectors;

output a signal indicating that the second points correspond to the first designated type; and control, based on the signal, autonomous driving of the vehicle.

2. The apparatus claim 1, wherein the processor is configured to:

determine, based on the designated condition being satisfied and the number of the second points included in the at least one grid being smaller than a threshold number, that the second points correspond to the first designated type.

3. The apparatus claim 1, wherein the processor is configured to:

determine that the second points correspond to the first designated type based on the designated condition being satisfied and an angle between the direction of the maximum eigen vector and a reference axis, of the vehicle coordinate system, exceeding a threshold angle.

4. The apparatus claim 1, wherein the processor is configured to:

determine that the second points correspond to the first designated type based on the designated condition being satisfied and an angle between the direction of the minimum eigen vector and a reference axis, of the vehicle coordinate system, exceeding a threshold angle.

5. The apparatus claim 1, wherein the processor is configured to:

determine that the second points correspond to the first designated type based on the designated condition being satisfied and the location of the at least one grid being located in a designated area among a plurality of areas designated in advance on the grid map.

6. The apparatus claim 1, wherein the processor is configured to:

determine that the second points correspond to the first designated type based on the designated condition being satisfied and an angle between a y-axis of the vehicle coordinate system and the minimum eigen vector exceeding a threshold angle, wherein the y-axis is perpendicular to an x-axis of the vehicle coordinate system, and wherein the x-axis is parallel to a moving direction of the vehicle.

7. The apparatus claim 1, wherein the processor is configured to:

determine that the second points correspond to the first designated type based on the designated condition being satisfied and the locations of the second points being located to be smaller than a threshold height from a ground.

8. The apparatus claim 1, wherein the processor is configured to:

assign, based on determining that the second points correspond to the first designated type, a flag indicating the first designated type to the second points.

9. The apparatus claim 1, wherein the processor is configured to:

determine whether the second points are located in one of a plurality of areas obtained by dividing the grid map, based on at least one of:

an angle between a reference axis of the vehicle coordinate system and a vector associated with the plurality of points, or a shortest distance among distances between the vehicle and each of the plurality of points.

10. The apparatus claim 1, wherein the processor is configured to:

map the plurality of points onto the grid map, wherein the plurality of points correspond to at least one object located within a designated distance from the vehicle.

11. A method performed by an apparatus for controlling autonomous driving of a vehicle, the method comprising:

determining, based on a first algorithm, a location of each of a plurality of points on a grid map, wherein the plurality of points are associated with a surrounding environment of the vehicle, and wherein the grid map is generated by dividing a vehicle coordinate system centered on the vehicle;

obtaining, based on a second algorithm, at least one of eigen values or eigen vectors, wherein the second algorithm is configured to be applied to second points, among the plurality of points, based on identifying, on the grid map, at least one grid where the second points are processed as a second designated type and first points, among the plurality of points, are processed as a first designated type different from the second designated type; and determining whether a designated condition is satisfied by at least one of:

a number of the second points included in the at least one grid, a direction of a maximum eigen vector, a direction of a minimum eigen vector, a location of the at least one grid on the grid map, or locations of the second points in the at least one grid;

determining that second points correspond to the first designated type, based on the designated condition being satisfied and based on at least one of: the maximum eigen vector corresponding to a maximum value of eigen values among the eigen vectors or the minimum eigen vector corresponding to a minimum value of the eigen values among the eigen vectors;

outputting a signal indicating that the second points correspond to the first designated type; and controlling, based on the signal, autonomous driving of the vehicle.

12. The method of claim 11, further comprising:

determining, based on the designated condition being satisfied and the number of the second points included in the at least one grid being smaller than a threshold number, that the second points correspond to the first designated type.

13. The method of claim 11, further comprising:

determining that the second points correspond to the first designated type based on an angle between the direction of the maximum eigen vector and a reference axis, of the vehicle coordinate system, exceeding a threshold angle.

14. The method of claim 11, further comprising:

determining that the second points correspond to the first designated type based on the designated condition being satisfied and an angle between the direction of the minimum eigen vector and a reference axis, of the vehicle coordinate system, exceeding a threshold angle.

15. The method of claim 11, further comprising:

determining that the second points correspond to the first designated type based on the designated condition being satisfied and the location of the at least one grid being located in a designated area among a plurality of areas designated in advance on the grid map.

16. The method of claim 11, further comprising:

determining that the second points correspond to the first designated type based on the designated condition being satisfied and an angle between a y-axis of the vehicle coordinate system and the minimum eigen vector exceeding a threshold angle, wherein the y-axis is perpendicular to an x-axis of the vehicle coordinate system, and wherein the x-axis is parallel to a moving direction of the vehicle.

17. The method of claim 11, further comprising:

determining that the second points correspond to the first designated type based on the designated condition being satisfied and the locations of the second points being located to be smaller than a threshold height from a ground.

18. The method of claim 11, further comprising:

assigning a flag indicating the first designated type to the second points based on determining that the second points correspond to the first designated type.

19. The method of claim 11, further comprising:

determining whether the second points are located in one of a plurality of areas obtained by dividing the grid map, based on at least one of:

an angle between a reference axis of the vehicle coordinate system and a vector associated with the plurality of points, or a shortest distance among distances between the vehicle and each of the plurality of points.

20. The method of claim 11, further comprising:

mapping the plurality of points onto the grid map, wherein the plurality of points correspond to at least one object located within a designated distance from the vehicle.

* * * * *